INVENTORS.
DAVID E. ALBRECHT &
STEPHAN A. GRUBICH
BY

ATTORNEYS

INVENTORS.
DAVID E. ALBRECHT &
STEPHAN A. GRUBICH

ATTORNEYS 2,779,412
APPARATUS FOR CUTTING HOSE

David E. Albrecht, Philadelphia, and Stephan A. Grubich, Lafayette Hills, Pa., assignors to Hose Accessories Co., Philadelphia, Pa., a corporation of Pennsylvania Application April 13, 1953, Serial No. 348,241

5 Claims. (Cl. 164—60)

This invention relates to apparatus for cutting hose.

The object of this invention is to provide apparatus for cutting hose which is at once easy to operate and which reduces the total load imposed on the cutting apparatus.

This and other objects of this invention will become apparent from a reading of the description in conjunction with the drawings, in which.

Figure 1:
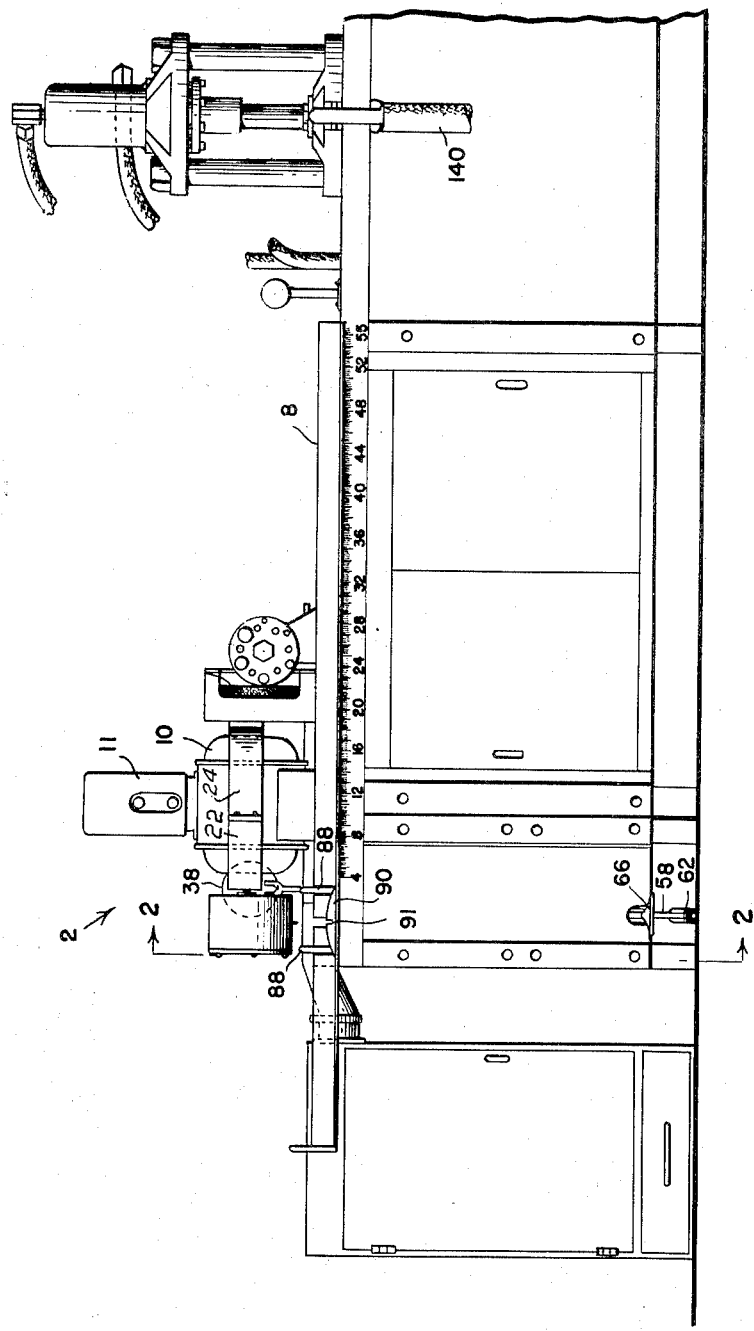
Figure 1 is a front elevation of apparatus in accordance with this invention.

As shown in Figure 1, the apparatus in accordance with this invention comprises a cutting mechanism 2 which is mounted on a bench 8.

The cutting mechanism 2 has a motor 10 controlled by a switch 11. Motor 10 has a shaft 12 on which is mounted a pulley 14 which carries a belt 16. The belt 16 also passes about a pulley 18, which has secured on one of its sides a circular knife 19. Pulley 18 is secured to a shaft 20 mounted in bearing box 22.

Figure 2:
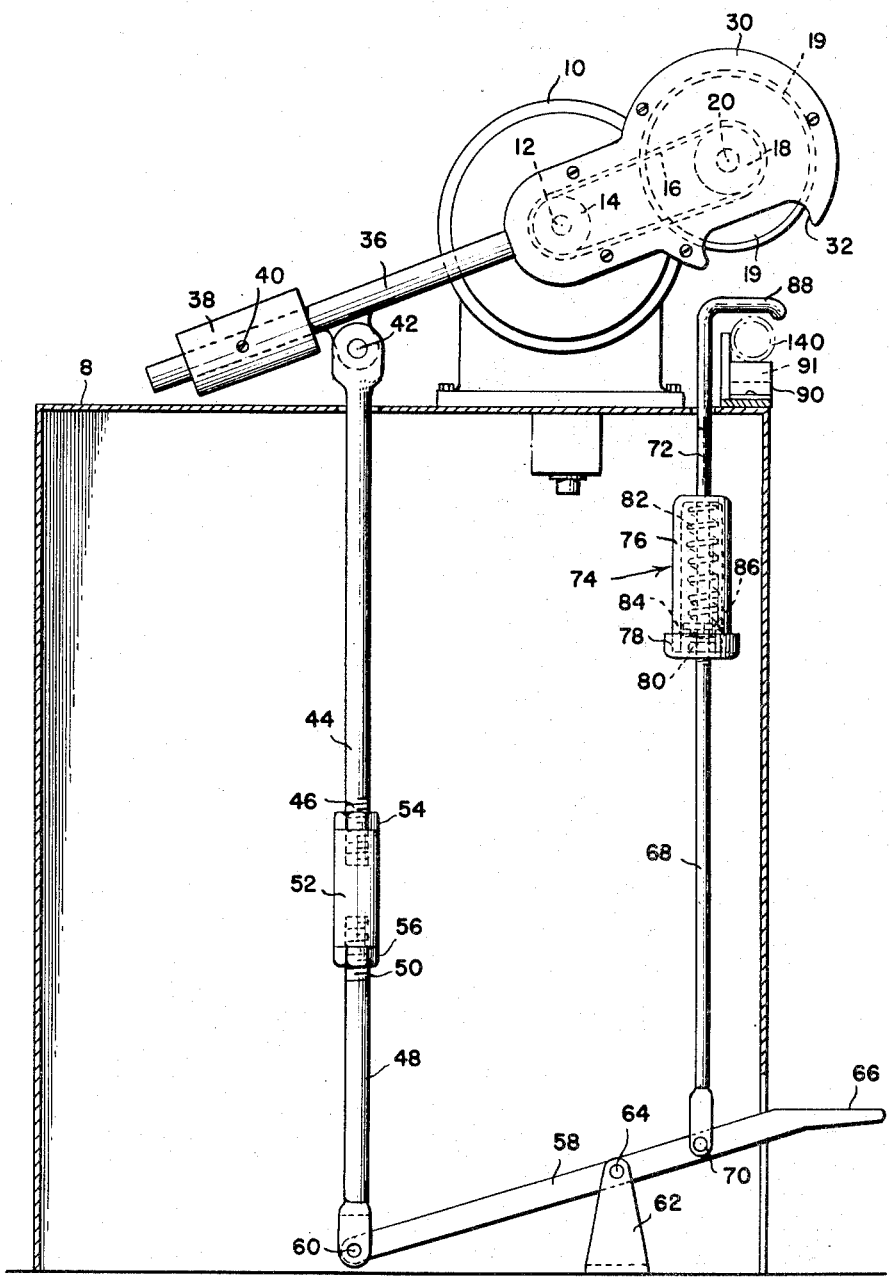
Figure 2 is a vertical section taken on the plane indicated by the line 2—2 in Figure 1.
Figure 3:
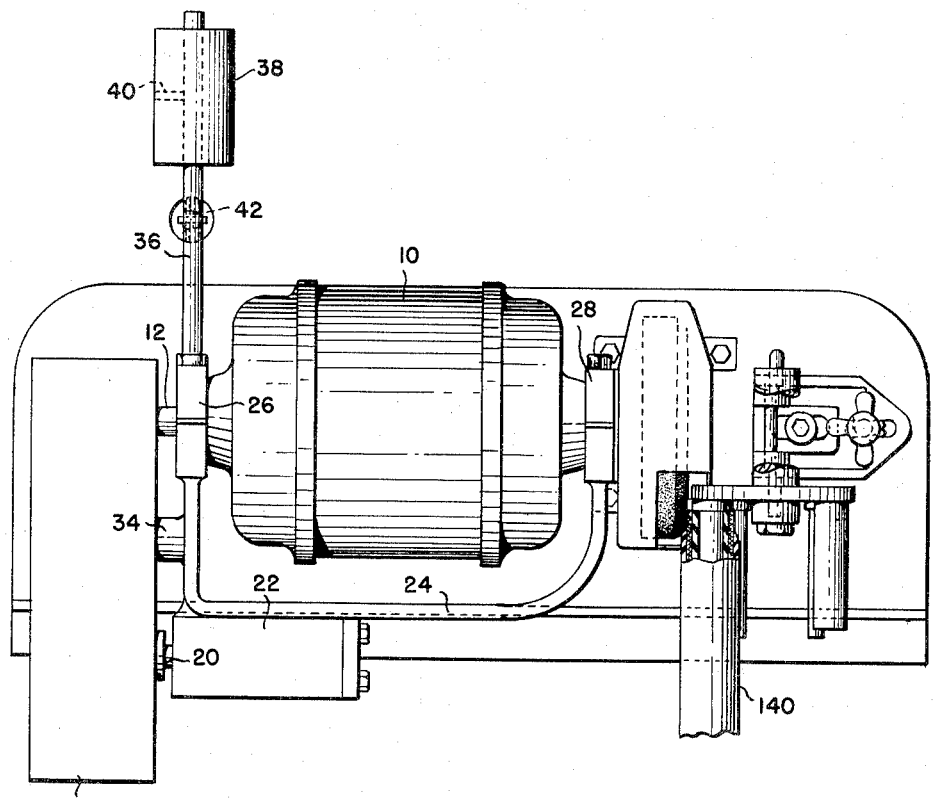
Figure 3 is a plan view of the cutting apparatus of Figure 1.

Bearing box 22 is secured to a yoke member 24, which is mounted for rotation about shaft 12 by split bearings 26 and 28. As is clearly shown in Figures 2 and 3, a shield 30 encompasses pulleys 14 and 18 and knife 19 with the exception of a lower portion of knife 19, which is exposed through an opening 32 in shield 30. The shield 30 is secured to yoke 24 by brace 34.

Extending to the rear of yoke 24 and connected thereto is an arm 36 having a weight 38 slidably adjusted therein by a set screw 40. Arm 36 is pivotally connected at 42 to a link 44, which has a threaded end 46. A link 48, having a threaded end 50, is connected to link 44 by a sleeve 52 and nuts 54 and 56 to provide for an adjustment of the length of links 44 and 48. Link 48 is pivotally connected to a lever 58 at 60. Lever 58 is pivotally secured to a bracket 62 at 64. The end 66 of lever 58 forms a foot pedal.

A link 68 is pivotally secured to lever 58 at 70. Link 68 is connected to a shank 72 through a spring mechanism 74. Spring mechanism 74 comprises a casing 76 having fixedly secured thereto a cap 78. Link 68 is secured to cap 78 by a nut 80. Shank 72 passes downwardly through casing 76 and a compression coil spring 82 and has secured at the end thereof a nut 84, which holds washer 86 against spring 82. Spring 82 acts to bias shank 72 and link 68 together. Shank 72 has secured thereto a pair of fingers 88, which extend in a substantially horizontal plane over bench 8. Beneath fingers 88 and mounted on bench 8 is a hose support member 90. The hose support member 90 has an arcuate upper surface, as shown in Figure 1. Arcuate support 90 has an opening 91, which permits knife 19 to descend below the surface of arcuate support 90 to provide a clean-cut of the hose.

As illustrative of the operation of the apparatus described above, a length of hose 140 is placed over arcuate support member 90 with the point at which it is desired to cut the hose immediately below knife 19, the hose lying below fingers 88. With motor 10 running and rotating knife 19 through pulleys 14 and 18 and belt 16, end 66 of lever 58 is depressed by, for example, the operator's foot. This results in the lowering of fingers 88 to pull hose 140 tightly about arcuate support 90. At the same time, through link 48, sleeve 52 and arm 36, yoke 24 is rotated about shaft 12, which results in the lowering of rotating knife 19. When fingers 88 can no longer be further depressed against hose 140, lever 58 continues to move downwardly by pulling casing 76 down against spring 82. Thus, knife 19 can be lowered to contact and cut through hose 140.

Applicant does not desire to be limited except as set forth in the following claims.

What is claimed is:

1. Apparatus for cutting rubber hose which comprises an arcuate hose support, finger means to clamp the hose to said support and a rotary knife in a plane perpendicular to the axis of the hose and adapted to be lowered against the hose and cut through the hose, said finger means engaging the hose at points on both sides of the plane in which the rotary knife lies.

2. Apparatus for cutting rubber hose which comprises an arcuate hose support, a pair of spaced fingers mounted for movement in a substantially vertical plane, a rotary knife mounted for movement in a substantially vertical plane and means to bring said fingers into engagement with the hose to clamp the hose to the support and to force the rotary knife downwardly through the hose between said fingers.

3. Apparatus for cutting rubber hose which comprises an arcuate hose support, a pair of spaced fingers mounted for movement in a substantially vertical plane, a rotary knife mounted for movement in a substantially vertical plane and means to bring said fingers into engagement with the hose to clamp the hose to the support and to force the rotary knife downwardly through the hose between said fingers, said arcuate hose support having a cutout portion adapted to receive the rotary knife after it has cut through the hose.

4. Apparatus for cutting rubber hose which comprises an arcuate hose support, a pair of spaced fingers to clamp the hose to said support, cutting means including a rotary knife adapted to engage said hose between said fingers, said cutting means being pivotally mounted for movement in a substantiatlly vertical plane, a pivotally mounted operating lever, means connecting said operating lever to said cutting means and means connecting said operating lever to said fingers, the movement of said operating lever effecting the simultaneous upward and downward movement of said cutting means and said fingers.

5. Apparatus for cutting rubber hose which comprises an arcuate hose support, a pair of spaced fingers to clamp the hose to said support, cutting means including a rotary knife adapted to engage said hose between said fingers, said cutting means being pivotally mounted for movement in a substantially vertical plane, a pivotally mounted operating lever, means connecting said operating lever to said cutting means, link means connecting said operating lever to said fingers, said link means including spring means providing for the continued movement of the operating lever after said fingers have tightly engaged the hose.

References Cited in the file of this patent

UNITED STATES PATENTS

| | | |
|---|---|---|
| 639,272 | Newton | Dec. 19, 1899 |
| 977,669 | McIntosh | Dec. 6, 1910 |
| 1,040,006 | Peuckert | Oct. 1, 1912 |
| 1,086,671 | Kaufman | Feb. 10, 1914 |
| 1,567,078 | Pennington | Dec. 29, 1925 |
| 1,955,811 | Irmscher | Apr. 24, 1934 |
| 2,122,186 | Southworth | June 28, 1938 |
| 2,452,728 | Carling | Nov. 2, 1948 |

FOREIGN PATENTS

| | | |
|---|---|---|
| 649,048 | Germany | Aug. 16, 1937 |